United States Patent
Wu et al.

(10) Patent No.: US 11,269,688 B2
(45) Date of Patent: Mar. 8, 2022

(54) SCALING DISTRIBUTED COMPUTING SYSTEM RESOURCES BASED ON LOAD AND TREND

(71) Applicant: EMC IP Holding Company LLC, Hopkinton, MA (US)

(72) Inventors: Jeff Wu, Shanghai (CN); Hui Li, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 112 days.

(21) Appl. No.: 16/223,950

(22) Filed: Dec. 18, 2018

(65) Prior Publication Data

US 2020/0192708 A1    Jun. 18, 2020

(51) Int. Cl.
  *G06F 9/50*    (2006.01)
  *G06F 11/34*    (2006.01)
  (Continued)

(52) U.S. Cl.
  CPC ............ *G06F 9/505* (2013.01); *G06F 9/5061* (2013.01); *G06F 11/3433* (2013.01);
  (Continued)

(58) Field of Classification Search
  CPC ...... G06F 9/505; G06F 16/289; G06F 16/907; G06F 16/285; G06F 16/2219; G06F 9/5061; G06F 11/3433; G06F 11/344; G06F 2201/81; G06F 2209/501; G06F 2209/5011; G06F 2209/5022; G06F 2209/508; G06F 11/3442
  See application file for complete search history.

(56) References Cited

U.S. PATENT DOCUMENTS

2008/0021865 A1*  1/2008  Corkill .................. G06F 16/221
2012/0317155 A1* 12/2012  Ogasawara ........... G06F 16/282
                                                                    707/812

(Continued)

OTHER PUBLICATIONS

Techopedia, "Key-Value Pair (KVP)," available: https://www.techopedia.com/definition/13645/key-value-pair-kvp (Year: 2017).*

(Continued)

*Primary Examiner* — Wing F Chan
*Assistant Examiner* — Billy H Ng
(74) *Attorney, Agent, or Firm* — Amin, Turocy & Watson, LLP

(57) ABSTRACT

The described technology is generally directed towards automatically scaling distributed computing resources of a distributed computing system based on a system load measurement and a trend factor indicative of whether the system load is increasing or decreasing. If a computing resource load value is above a resource addition threshold value and the trend factor indicates that the computing resource load is increasing, a corresponding computing resource is added to the distributed computing system. If a computing resource load value is below a resource removal threshold value and the trend factor indicates that the computing resource load is decreasing, a corresponding computing resource is removed from the distributed computing system. The trend factor can be obtained using a moving average convergence divergence (MACD) direction indicator.

20 Claims, 11 Drawing Sheets

Figure 1:
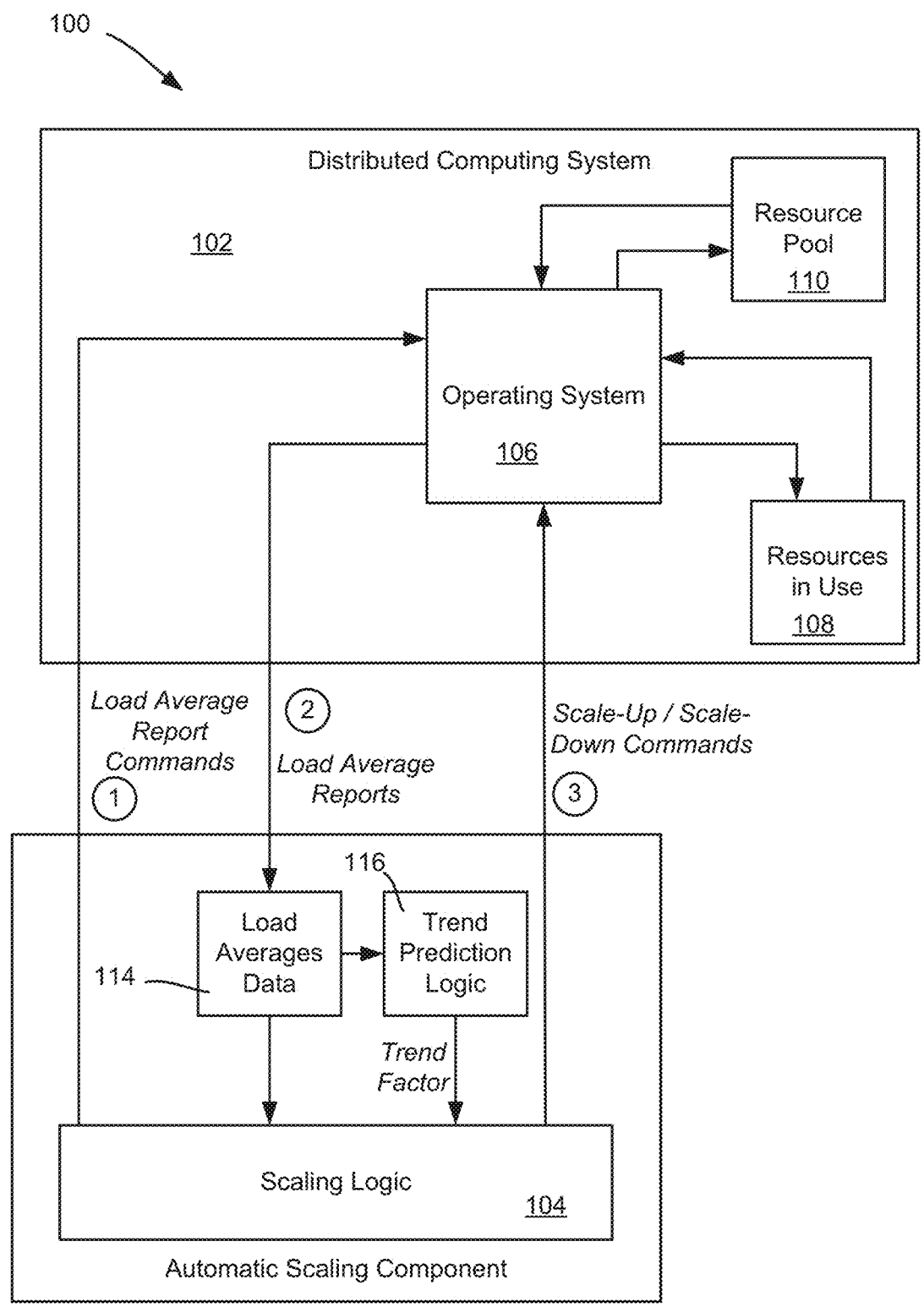

(51) Int. Cl.
   *G06F 16/22*       (2019.01)
   *G06F 16/28*       (2019.01)
   *G06F 16/907*      (2019.01)

(52) U.S. Cl.
   CPC ...... *G06F 11/3442* (2013.01); *G06F 16/2219* (2019.01); *G06F 16/285* (2019.01); *G06F 16/289* (2019.01); *G06F 16/907* (2019.01); *G06F 2201/81* (2013.01); *G06F 2209/501* (2013.01); *G06F 2209/508* (2013.01); *G06F 2209/5011* (2013.01); *G06F 2209/5022* (2013.01)

(56) References Cited

U.S. PATENT DOCUMENTS

| | | | |
|---|---|---|---|
| 2013/0086303 A1* | 4/2013 | Ludwig | G06F 21/00 |
| | | | 711/103 |
| 2014/0137110 A1* | 5/2014 | Engle | G06F 9/505 |
| | | | 718/1 |
| 2016/0188370 A1* | 6/2016 | Razin | G06F 11/3495 |
| | | | 718/104 |
| 2018/0260465 A1* | 9/2018 | Hegde | G06F 16/2219 |
| 2019/0222533 A1* | 7/2019 | Lund | G06F 9/5083 |

OTHER PUBLICATIONS

Wu et al. "Scaling a Number of Segments in a Stream of Data Based on Communication Load and Trend Direction" U.S. Appl. No. 16/281,344, filed Feb. 21, 2019, 36 pages.

* cited by examiner

SCALING DISTRIBUTED COMPUTING SYSTEM RESOURCES BASED ON LOAD AND TREND

TECHNICAL FIELD

The subject application generally relates to distributed computing systems, and, for example, to automatically scaling distributed computing system resources based on current system load and a trend factor, and related embodiments.

BACKGROUND

In a distributed computing system, load scalability refers to the ability of the distributed computing system to handle increasing or decreasing workloads, by scaling up the resources in use to accommodate heavier loads, or scaling down the resources to accommodate lighter loads (and thereby conserve resources). A typical way in which to decide whether to add or remove resources is based on average system load utilization, e.g., evaluated against threshold values.

However, at times the system load average can be deceiving. As a result, basing scalability decisions on the system load average sometimes causes resources to be unnecessarily added, and at other times causes resources to be prematurely deleted.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards evaluating a computing resource load value that represents a computing resource load in a distributed computing system, and a trend factor that indicates whether the computing resource load is increasing or decreasing. In response to the computing resource load value being above a resource addition threshold value and the trend factor indicating that the computing resource load is increasing, a computing resource is added to the distributed computing system. Further, a computing resource can be removed from the distributed computing system, e.g., in response to the computing resource load value being below a resource removal threshold value and the trend factor indicating that the computing resource load is decreasing.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which:

FIG. 1 is an example block diagram representation of a districted computing system having resources scaled by an automatic scaling component, in accordance with various aspects and implementations of the subject disclosure.

FIG. 2 is an example graphical representation of distributed computing system resource load average in a distributed computing system over time, in accordance with various aspects and implementations of the subject disclosure.

FIG. 3 is an example graphical representation of a moving average convergence divergence (MACD) direction indicator that can be used for predicting system resource load trend, in accordance with various aspects and implementations of the subject disclosure.

FIGS. 4-6 comprise a flow diagram representing example operations for using system resource load and a system resource load trend factor for automatically scaling distributed computing system resources, in accordance with various aspects and implementations of the subject disclosure.

FIG. 7 is a flow diagram representing example operations for evaluating system resource load and a system resource load trend factor for automatically adding a resource to a distributed computing system, in accordance with various aspects and implementations of the subject disclosure.

FIG. 8 is a flow diagram representing example operations of an automatic scaling component in determining whether to add or remove a resource from a distributed computing system based on load and trend factor, in accordance with various aspects and implementations of the subject disclosure.

FIG. 9 is a flow diagram representing example operations for automatically scaling a distributed computing system based on load and trend factor, in accordance with various aspects and implementations of the subject disclosure.

FIG. 10 depicts an example schematic block diagram of a computing environment with which the disclosed subject matter can interact.

FIG. 11 illustrates an example block diagram of a computing system operable to execute the disclosed systems and methods in accordance with various aspects and implementations of the subject disclosure.

DETAILED DESCRIPTION

Various aspects described herein are generally directed towards a predictable automatic scaling technology, which based on a measure of the system load (e.g., of any resource or combination of resources) in conjunction with a trend and direction of the system load. The use of the direction and trend makes the automatic scaling decisions more intelligent in practical application usage.

By way of example, consider that the average system load is measured and reported to be above a resource addition threshold. Simply adding resource(s) in this state, as is typically done, can unnecessarily and wastefully add resources if the system load is decreasing. Similarly, if the average system load is measured and reported to be below a resource removal threshold, removing resource(s) in this state, as is typically done, is premature if the load is system increasing and the removed resource(s) are going to be needed again relatively soon.

The technology described herein makes a resource scaling decision based on average system load along a trend factor that indicates whether the load is increasing or decreasing. The use of the trend factor that predicts a direction of the system load makes the scalability decision as to whether to add or remove one or more resources more intelligent and more accurate, as the scalability determination is less likely to waste resources and/or prematurely remove distributed computing resources.

Note that as used herein, the terms “system” and “resource” with respect to load and scalability are generally interchangeable. For example, a system load can be measured by measuring the load (e.g., utilization) of a resource, and thus scalability can adjust the load by adding or removing resources. However, it is feasible to consider more than one resource as being scaled based on a measured resource load; e.g., if processor utilization is high and increasing, adding a processor can automatically add additional memory that the processor is likely to access. Indeed, some resources are typically a combination of resources; e.g., adding a physical server typically adds at least one processor and memory, and often adds disk storage. Moreover, as used herein, "number of computing resources" can be any one or more resources in any units; e.g., adding a disk drive resource can be to add a single physical disk drive regardless of its size, or can be to add a disk drive resource of X terabytes independent of how many actual physical disks are needed to provide that many terabytes, and so on.

As will be understood, the implementation(s) described herein are non-limiting examples, and variations to the technology can be implemented. For instances, many of the examples herein are based on the scaled distributed computing resources being a processor, e.g., the scaling determination is directed towards adding a processor, removing a processor or leaving the number of processors in the distributed computing resources as is until a next decision time. However, the technology described herein can provide benefits with any type of distributed computing resource that can have its load measured and be allocated/scaled on demand, including, but not limited to storage (any storage device/load in any units, e.g., memory in capacity or number of memory components, disk storage/load in number of disks or disk capacity), servers, physical or virtual machines, pods, containers, bandwidth (e.g., I/O and network), program instances, service instances, utilization of threads and so forth. As such, any of the embodiments, aspects, concepts, structures, functionalities, implementations and/or examples described herein are non-limiting, and the technology may be used in various ways that provide benefits and advantages in distributed computing and resource usage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Turning to the drawings, FIG. 1 shows system 100 comprising a distributed computing system 102 coupled to an automatic scaling component 104. As is understood, the automatic scaling component can be run on resources of the distributed computing system, or can be an externally coupled component that communicates over a network link such as over an intranet and/or the internet.

The distributed computing system 102 includes an operating system 106, such as a Linux®-based distrusted operating system. The operating system 106 manages the resources in use 108, and can add or remove resources to or from those resources in use 108 from a resource pool 110 or the like. Note that the resources in use 108 refer to those resources associated with a specific entity (e.g., program/system) that is using them, such as DELL/EMC's Pravega® open-source streaming storage system; if other entities are also using the distributed computing system 102, such other entities can have their own sets of allocated resources in use.

The automatic scaling component 104 comprises scaling logic 112, example operations of which are described herein with reference to 4-6. In general and as will be understood, the automatic scaling component 104 communicates with the operating system 106 of the distributed computing system 102 to scale up or scale down the resources in use 108 as deemed appropriate.

More particularly, in one or more implementations, the scaling logic 104, e.g., periodically or as otherwise needed, sends a load average report command (arrow 1) to the operating system 106. For each such command, the operating system 106 responds with a load average report (arrow 2). In this way, the scaling logic obtains the measured load average(s) over a prior period of time, which is one factor in determining whether to increase or decrease resources. Moreover, the reported load averages data 114 is maintained for use in trend prediction, by trend prediction logic 116, which as described herein is another factor (the trend factor) in determining whether to increase or decrease resources in use; arrow 3 represents scale-up/scale down commands for this purpose.

By way of example, in Linux®, "top" or "uptime" commands can be sent to obtain a load average report. As a more particular example, entering "uptime" on a Linux® system can return:
$ uptime
9:12:11 up 5 min, 3 users, load average: 0.56, 0.23, 0.68
In the above example, the three numbers in the report show the load average for the last minute (0.56), the last five minutes (0.23), and the last fifteen minutes (0.68).

Note that if only measuring CPU utilization, the load average definition sometimes can be ambiguous and simplistic in certain scenarios, as a more accurate system load average can calculate/combining utilization information for CPU, memory, bandwidth, disk load, and average utilization of threads, for example. Notwithstanding, for CPU-intensive systems, measuring only the CPU utilization is sufficient in many scenarios.

As another example, in the system, if the CPU processor number is 2, the "uptime" command returns
$ uptime
9:30:10 up 23 min, 3 users, load average: 2.5, 2.3, 2.1
Prior solutions trigger workload scalability based on the load average threshold; for example, if the average load of the last five minutes is greater than a corresponding threshold value, the trigger event adds the resources, whereas if the average load of the last five minutes is less than a corresponding threshold value, the event is triggered to remove the resource. Note that the threshold level value for resource (CPU in this example) addition (L1) can be computed as the number of CPUs times a predetermined addition percentage such as eighty percent, and the threshold level value for resource removal (L0) can be computed as the number of CPUs times a predetermined removal percentage such as thirty percent.

Figure 2:
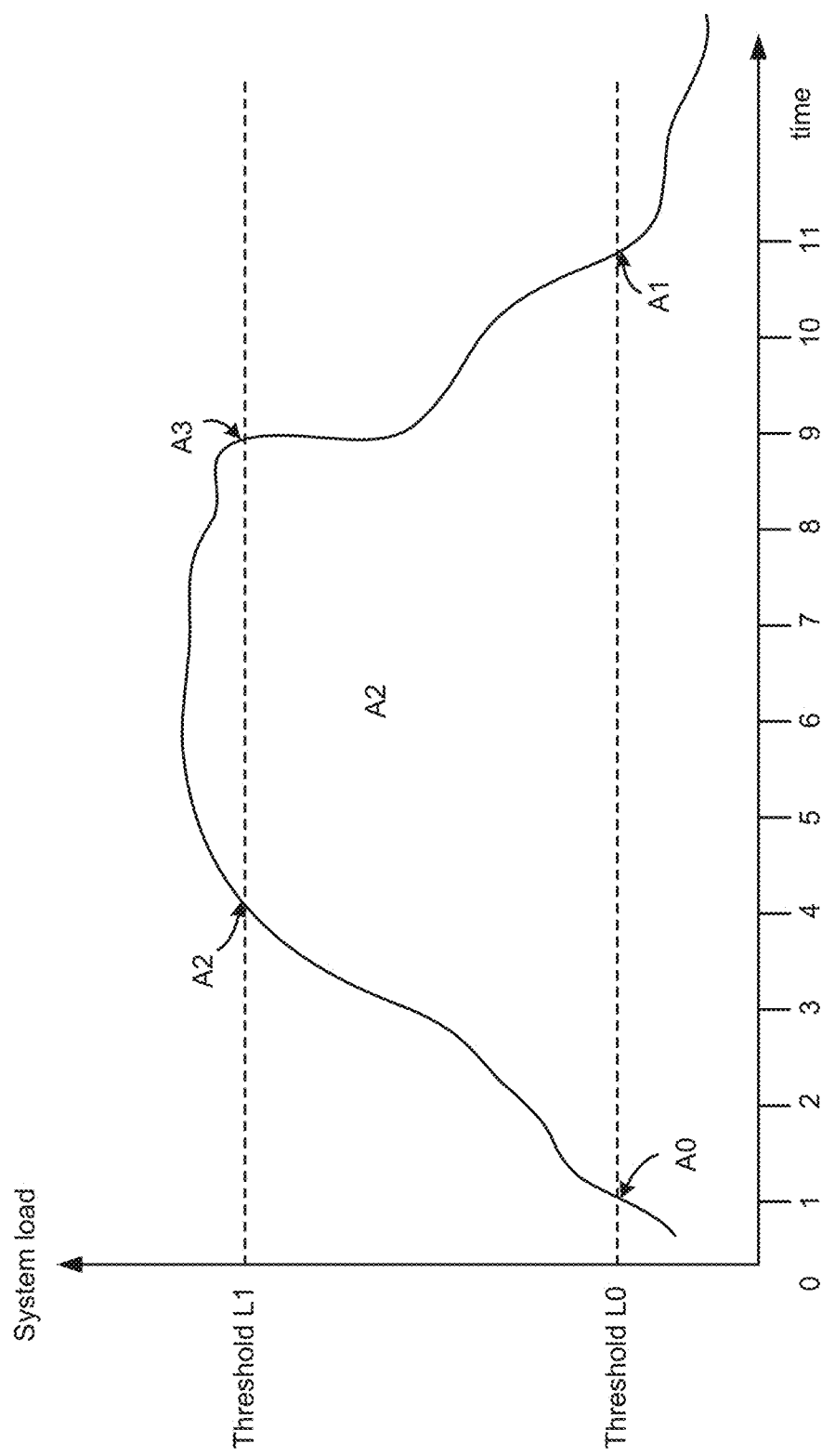

FIG. 2 shows a particular graphical example of measured system load over time, with four points A0-A3 at which a decision can be made. As can be seen, at points A0 and A1 the system (e.g., CPU resource) load is below the L0 removal threshold value, while at points A2 and A3 the system (e.g., CPU resource) load is above the L1 resource addition threshold. Because A0<L0 and A1<L0, prior solutions remove a resource at the A0 and A' points; similarly because A2>L1 and A3>L1, prior solutions add a resource at the A2 and A3 points.

An evaluation of the graph shows that at the point A0, the system load is increasing and thus removal of a resource as in the prior solutions is generally not desirable. Similarly, at the point A3, the system load is decreasing, whereby addition of a resource as in the prior solutions is generally not desirable.

The technology described herein uses this increasing or decreasing information, referred to herein as the trend or trend factor, in conjunction with the measured system (resource or resources) load to decide whether to add or remove a resource (which can be one or more resources). In this way, the following decisions are made with respect to the four points A0-A3 in FIG. 2:

At the A0 point, A0<L0, but because the system load is increasing, the scaling component 104 does not remove the resource;

At the A1 point, A1<L0, and because the system load is decreasing, the scaling component 104 removes the resource;

At the A2 point, A2>L1, and D=1, because the system load is increasing, the scaling component 104 adds the resource; and At the A3 point, A3>L1, but because the system load is decreasing, the scaling component 104 does not add the resource.

The trend factor can be represented by a value that indicates the increasing or decreasing direction (trend factor $\vec{D}$) of the system load, which can be represented as 1 (increasing) or −1 (decreasing), such that $|\vec{D}|=1$. If T represents a threshold, a system load threshold, the threshold with trend factor X can be abstracted into the formula:

$$X = \vec{D}T, |\vec{D}| = 1$$

Figure 3:
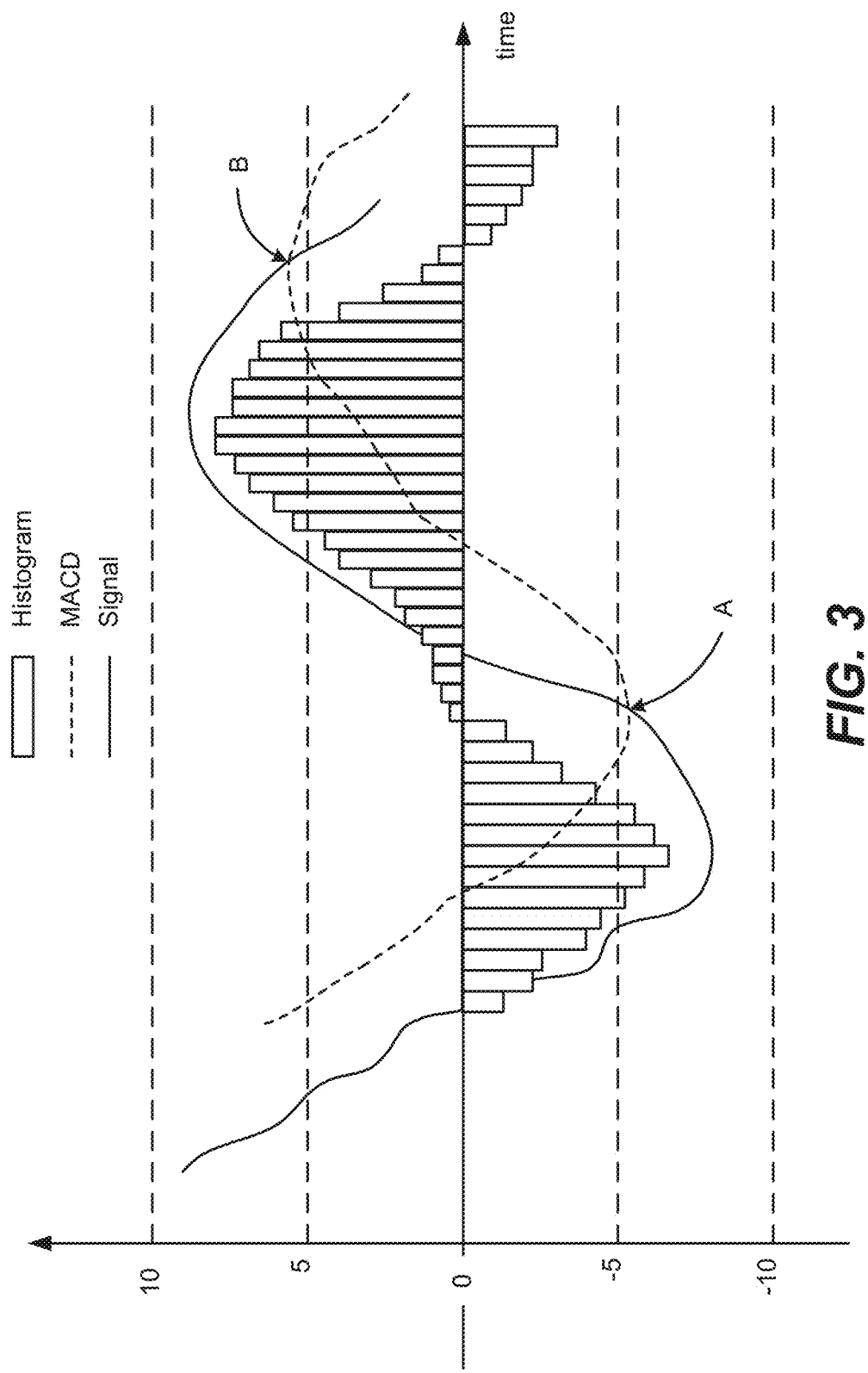

FIG. 3 shows one indicator that can be used to predict the trend of whether the computing resource load of distributed computing system 102 is increasing or decreasing, namely the moving average convergence divergence (MACD) indicator can be employed by one or more embodiments as one suitable trend prediction algorithm for use by automatic scaling component 104 to determine whether to communicate with the operating system 106 of distributed computing system 102 to scale up or scale down the resources available for use 108 by the distributed computing system 102. MACD is a trend-following momentum and direction indicator that shows the relationship between two moving averages of loads (often used in financial decision making). A typical MACD chart comprises of three elements as shown in FIG. 3, which show a MACD indicator for the system load in an actual Pravega® search over two hours. A first element of a MACD chart is the difference between an M-period and N-period exponential moving average (EMA) of the closing load average; this is the MACD line, shown in FIG. 3 as a dashed line. A second element is the EMA of the difference, referred to as the signal line, shown in FIG. 3 as a solid line. The third element is the MACD line minus the signal line value at different time samplings, and is known as the histogram, shown via the vertical bars in FIG. 3.

As can be seen in FIG. 3, the MACD line follows the trend and is particularly suitable for determining when to trigger a scaling operation. The point A in FIG. 3 shows that when the histogram goes from negative to positive (relative to the zero baseline) and the rising MACD crosses the signal line, then the system load is increasing, and in the above formula $\vec{D}=1$. At point B, the histogram goes from positive to negative, and a falling MACD crosses over the signal line, then the system load is decreasing and $\vec{D}=-1$.

In this way, MACD can be used to predict load trends and directions, which thereby can generate resource addition and deletion signals. Note that the example shows a straightforward MACD trend determination, however other variations of MACD can be used, e.g., to wait a short time for a confirmed "crossover" to avoid being deceived and scale up or scale down resource usage too early, and so on. Further note that MACD is only one way to predict a trend, and other trend prediction technologies can be used instead of or in addition to MACD.

To summarize, based on the MACD trend prediction logic 116, the scaling logic obtains the trend factor $\vec{D}$ value, and via the trend factor threshold, implements predictable automatic scaling to predict in advance whether to add or remove resources.

Figure 4:
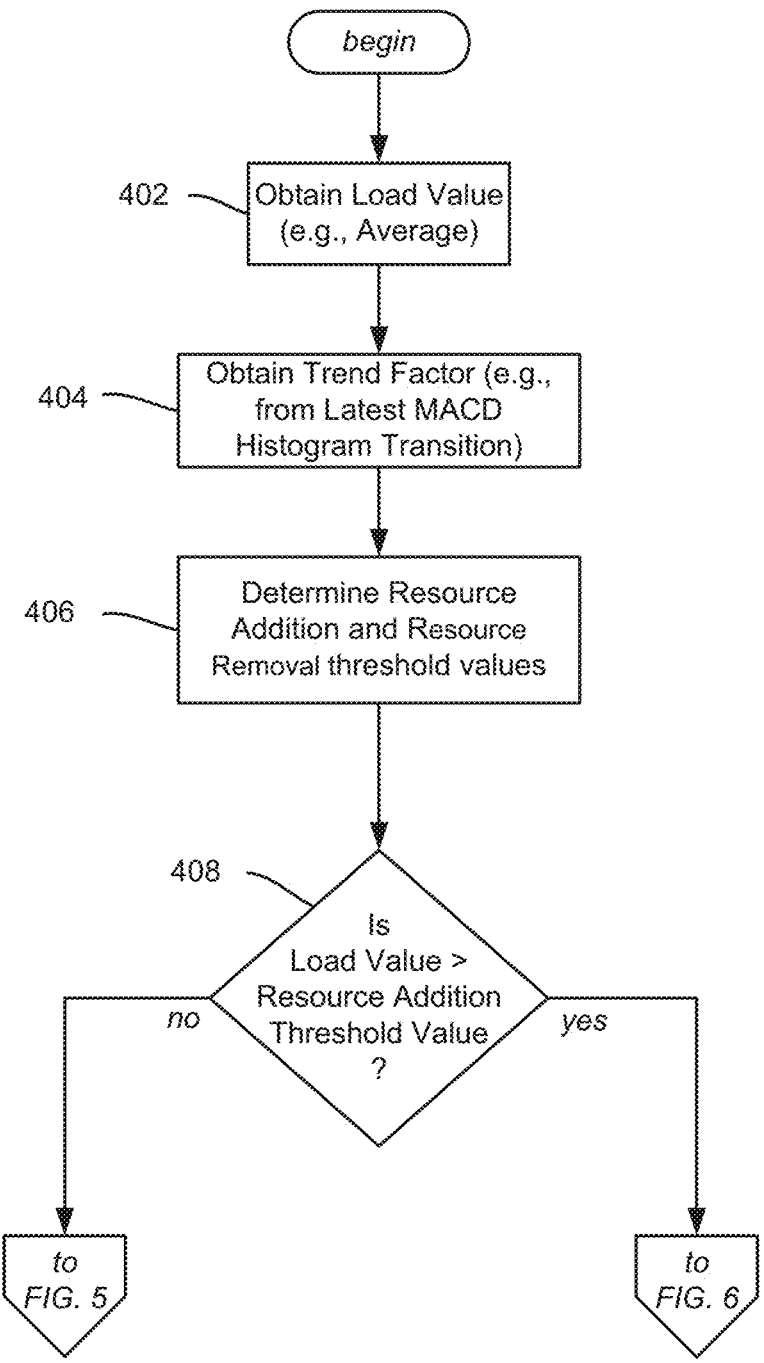
Figure 5:
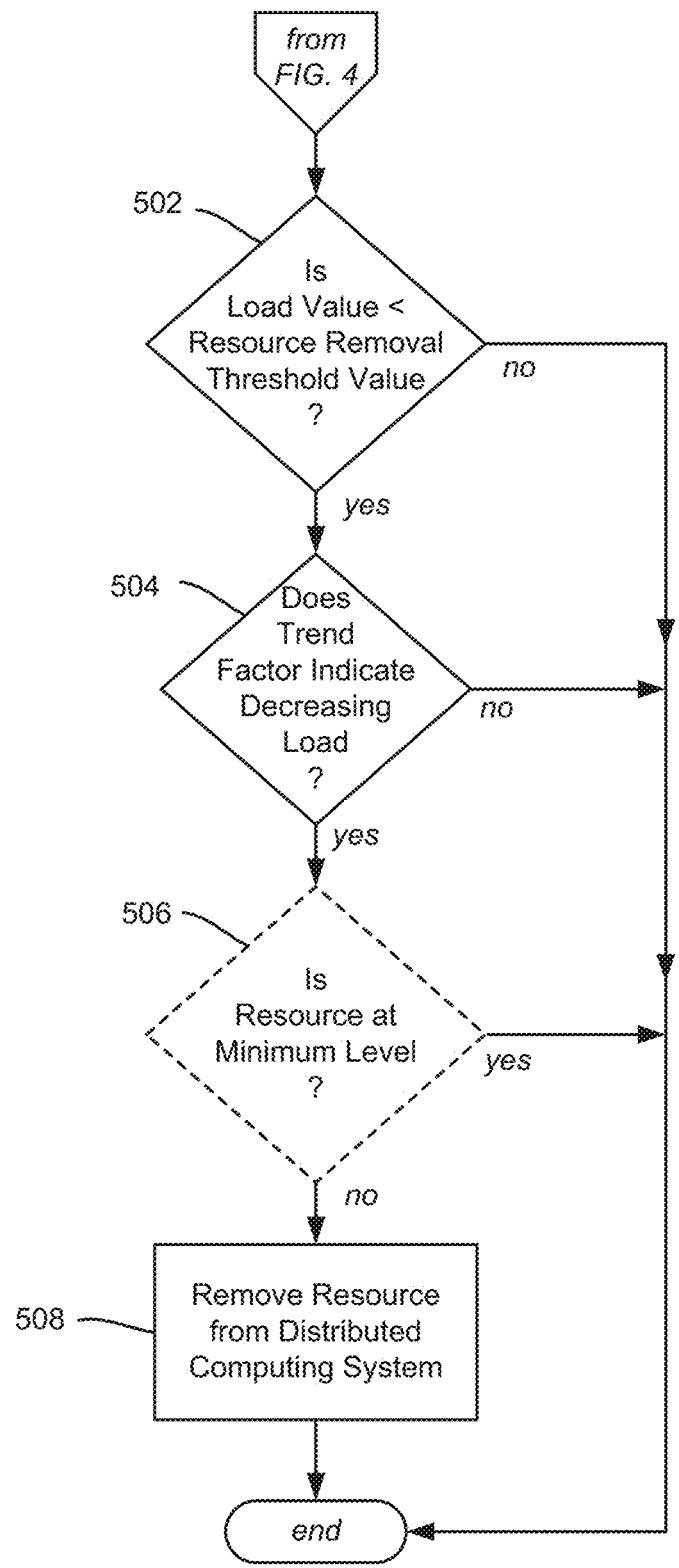
Figure 6:
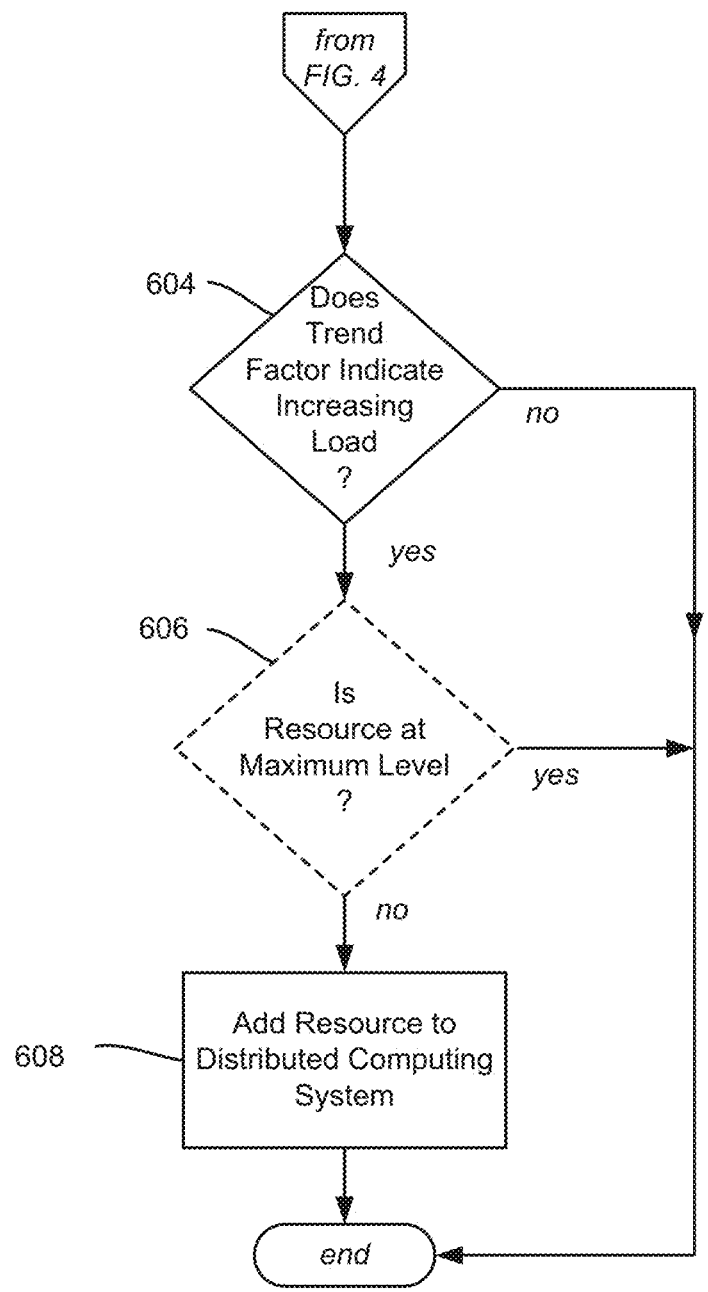

FIGS. 4-6 comprises a flow diagram exemplifying aspects of the scaling logic, which can be represented by the following pseudocode:

D=MACD ( )//return 1, or −1;
$T_A$=CPU processor*80% for the resource addition threshold value;
$T_R$=CPU processor*30% for the resource removal threshold value;
If (load>$T_A$ && D=1), then add the resource;
If (load<$T_R$ && D=−1), then remove the resource.

Operation 402 represents obtaining the system load, e.g., via a Linux® command, and operation 404 represents obtaining the trend factor, e.g., by calling the trend prediction logic 116 (a MACD function).

Operation 406 computes the threshold values, e.g., the number of CPUs in use times 0.8 for the addition threshold value, and the number of CPUs in use times 0.3 for the removal threshold value. Note that these multiplication factors can be varied based on empirical evidence, can differ based on type of resource and so on, however these factors have been found suitable for CPU scaling. In general, an addition threshold would use a factor greater than fifty percent, and a removal threshold computation would use a factor less than fifty percent.

Operation 408 evaluates whether the load value is greater than the resource addition threshold value. If not, the process continues to FIG. 5 to evaluate whether a resource should be removed based on the trend; if so, the process continues to FIG. 6 to evaluate whether a resource should be added based on the trend.

If the load is below the resource addition threshold value, operation 502 of FIG. 5 evaluates whether the load is also below the resource removal threshold value. If not, then the load is between the two thresholds, and in one or more implementations the resource allocation is appropriate and nothing needs to be done at this time; thus the process ends until the next scalability decision is needed.

If the load is below the resource removal threshold value, then operation 504 is performed to evaluate whether the trend factor indicates that the load is decreasing. If not, then again the current resource allocation is appropriate and nothing needs to be done at this time; thus the process ends until the next scalability decision is needed.

Operation 506 is an optional operation and represents, before removing a resource, whether the resource amount is at a minimum. For example, it may be beneficial to always have at least one CPU in use, even if idle, so that a user does not have to wait a frustrating amount of time to use a service. This is particularly true of resources that can take a long time to allocate; e.g., it can take on the order of minutes to spin up a virtual machine.

Thus, if below the resource removal threshold, and the trend factor indicates decreasing load, (and if evaluated, the resource is not at a minimum resource level), operation 508 removes the resource. The process resumes at the next resource scaling evaluation time, which can be triggered periodically, upon some event, at a certain time of day, and so forth.

Returning to operation 408 if the load value is greater than the resource addition threshold value, the process continues to FIG. 6 to evaluate whether a resource should be added based on the trend. Operation 604 is performed to evaluate whether the trend factor indicates that the load is increasing. If not, then the current resource allocation is appropriate for now, and the process ends until the next resource scalability decision is needed.

Similar to operation 506, operation 606 is an optional operation and represents, before adding a resource, whether the resource amount is at a maximum. For example, an enterprise may have reserved up to some amount of resources, and have to pay a large premium/penalty if going beyond that reserved number. Thus, before adding a resource beyond such a maximum, via optional operation 606 the resource addition can be bypassed, or possibly some other evaluation process can be invoked (e.g., whether this is a critical time-sensitive usage need, or can a user simply wait longer).

Thus, if above the resource addition threshold, and the trend factor indicates increasing load, (and if evaluated, the resource is not at a maximum resource level), operation 608 adds the resource. The process resumes at the next resource scaling evaluation time.

Figure 7:
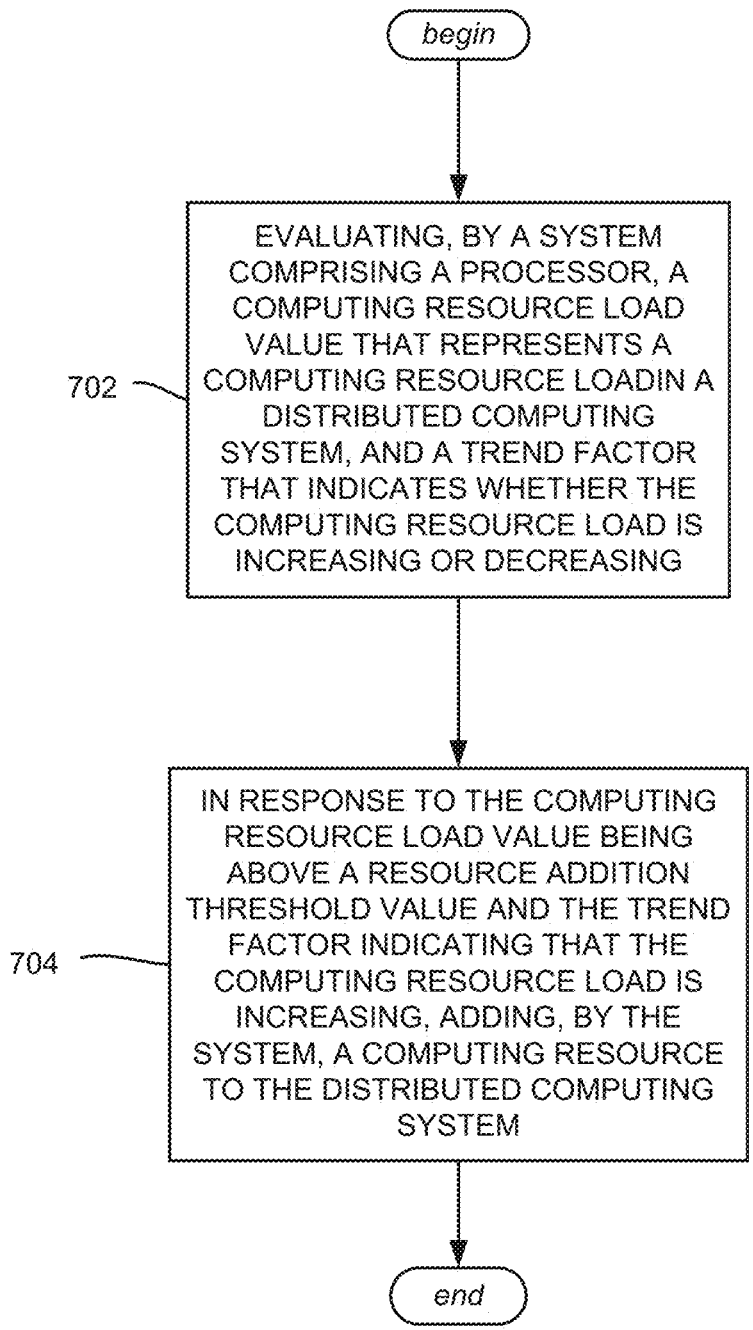

One or more aspects, generally exemplified in FIG. 7, can comprise operations, e.g., of a method. Operation 702 represents evaluating, by a system comprising a processor, a computing resource load value that represents a computing resource load in a distributed computing system, and a trend factor that indicates whether the computing resource load is increasing or decreasing. Operation 702 represents, in response to the computing resource load value being above a resource addition threshold value and the trend factor indicating that the computing resource load is increasing, adding, by the system, a computing resource to the distributed computing system.

Aspects can comprise, in response to the computing resource load value being less than a resource removal threshold value and the trend factor indicating that the computing resource load is decreasing, removing, by the system, a computing resource from the distributed computing system.

Aspects can comprise, in response to the computing resource load value being less than a resource removal threshold value, the trend factor indicating that the computing resource load is decreasing, and the computing resource not being at a minimum level, removing, by the system, a computing resource from the distributed computing system.

Aspects can comprise obtaining, by the system, the computing resource load value; the computing resource load value can comprise a reported resource load averaged over a prior interval time. Aspects can comprise obtaining, by the system, the trend factor based on a moving average convergence or divergence indicator of the computing resource load.

Aspects can comprise obtaining, by the system, the trend factor, wherein the trend factor indicates that the computing resource load is increasing when a moving average convergence divergence histogram is above a moving average convergence divergence baseline, and the trend factor indicates that the computing resource load is decreasing when the moving average convergence divergence histogram is below the moving average convergence divergence baseline.

Aspects can comprise obtaining, by the system, the computing resource addition threshold value based on multiplying a number of one or more computing resources by a predetermined addition percentage value.

The computing resource load can correspond to a number of one or more processors, and aspects can comprise obtaining, by the system, the computing resource addition threshold value based on multiplying the number of the one or more computing resources by about eighty percent.

Aspects can comprise, in response to the computing resource load value being less than a resource removal threshold value and the trend factor indicating that the computing resource load is decreasing, removing, by the system, a computing resource from the distributed computing system; the computing resource removal threshold value can be obtained by multiplying a number of computing resources by a predetermined removal percentage value. The computing resource load can correspond to a number of processors, and the computing resource removal threshold value can be obtained by multiplying the number of processors by about thirty percent.

Figure 8:
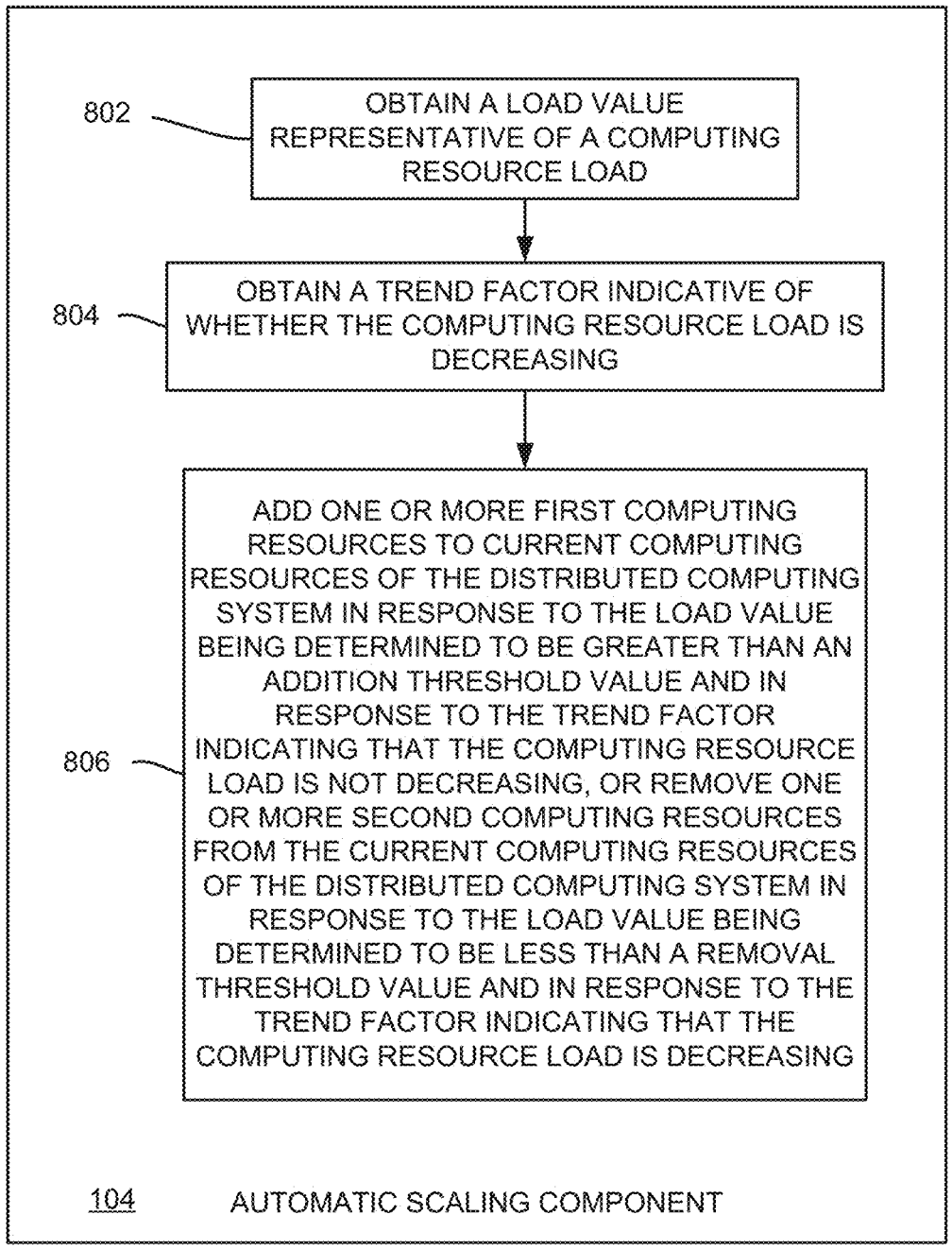

FIG. 8 represents an example system, comprising an automatic scaling component 104 that is operatively coupled to a distributed computing system. The automatic scaling component 104 can be configured to obtain a load value representative of a computing resource load (block 802) and obtain a trend factor indicative of whether the computing resource load is decreasing (block 804). As represented by block 806, the automatic scaling component 104 can add one or more first computing resources to current computing resources of the distributed computing system in response to the load value being determined to be greater than an addition threshold value and in response to the trend factor indicating that the computing resource load is not decreasing, or remove one or more second computing resources from the current computing resources of the distributed computing system in response to the load value being determined to be less than a removal threshold value and in response to the trend factor indicating that the computing resource load is decreasing.

The load value representative of the computing resource load can comprise a load average value determined over a prior time period. The load value representative of the computing resource load can correspond to measured processor utilization.

The trend factor can be based on a moving average convergence divergence indicator of the computing resource load. The addition threshold value can comprise a percentage value of greater than fifty percent multiplied by a number of one or more of the current computing resources currently in use. The removal threshold value can comprise a percentage value of less than fifty percent multiplied by a number of one or more of the current computing resources currently in use.

Figure 9:
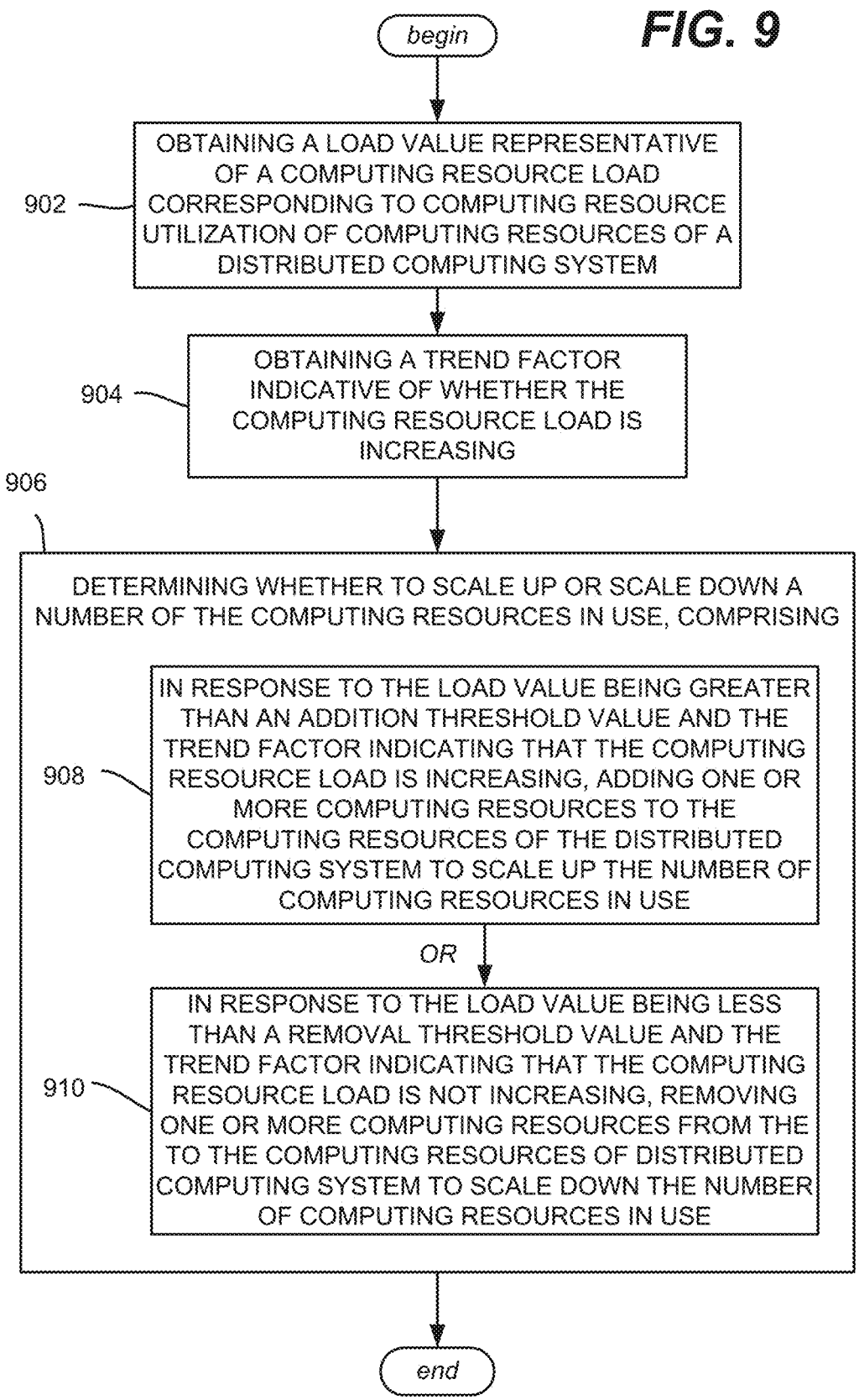

One or more aspects, such as implemented in a machine-readable storage medium, comprising executable instructions that, when executed by a processor, facilitate performance of operations, can be directed towards operations exemplified in FIG. 9. Example operation 902 represents obtaining a load value representative of a computing resource load corresponding to computing resource utilization of computing resources of a distributed computing system. Operation 904 represents obtaining a trend factor indicative of whether the computing resource load is increasing. Operation 906 represents determining whether to scale up or scale down a number of the computing resources in use, and can comprise (operation 908) in response to the load value being greater than an addition threshold value and the trend factor indicating that the computing resource load is increasing, adding one or more computing resources to the computing resources of the distributed computing system to scale up the number of computing resources in use, or (operation 910) in response to the load value being less than a removal threshold value and the trend factor indicating that the computing resource load is not increasing, removing one or more computing resources from the to the computing resources of distributed computing system to scale down the number of computing resources in use.

Further operations can comprise, obtaining the addition threshold value by multiplying the number of computing resources in use by an addition fractional value, and obtaining the removal threshold value by multiplying the number of computing resources in use by a removal fractional value. Obtaining the trend factor can comprise forecasting a system load trend using a result of a moving average convergence divergence prediction. Obtaining the load value can comprise requesting a report of a load average measured over a prior time period measured for the distributed computing system.

As can be seen, the technology described herein uses a load trend factor as part of determining whether to add or remove resource(s) to a distributed computing system. The technology thus is advantageous, including that it avoids unnecessary addition of unneeded resources or premature removal of resources likely to be needed soon.

Figure 10:
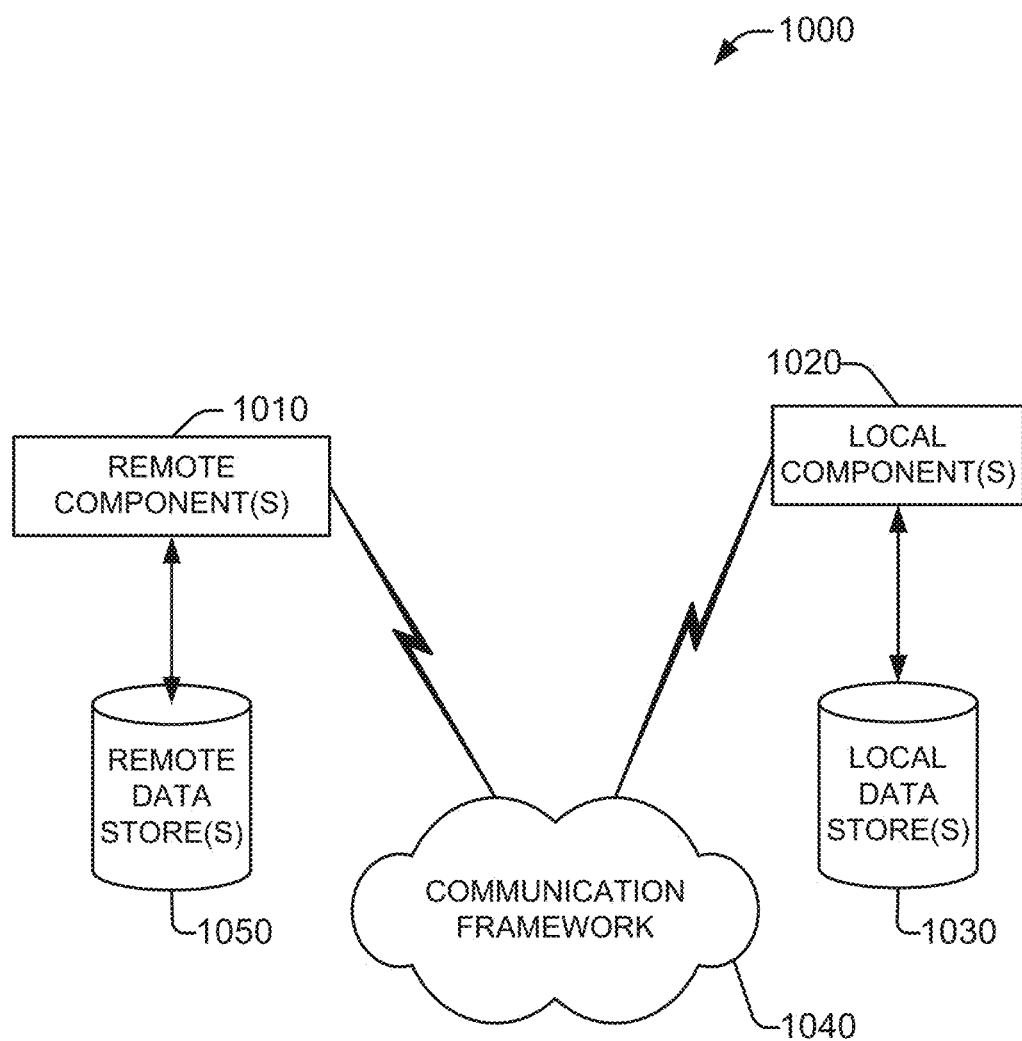

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
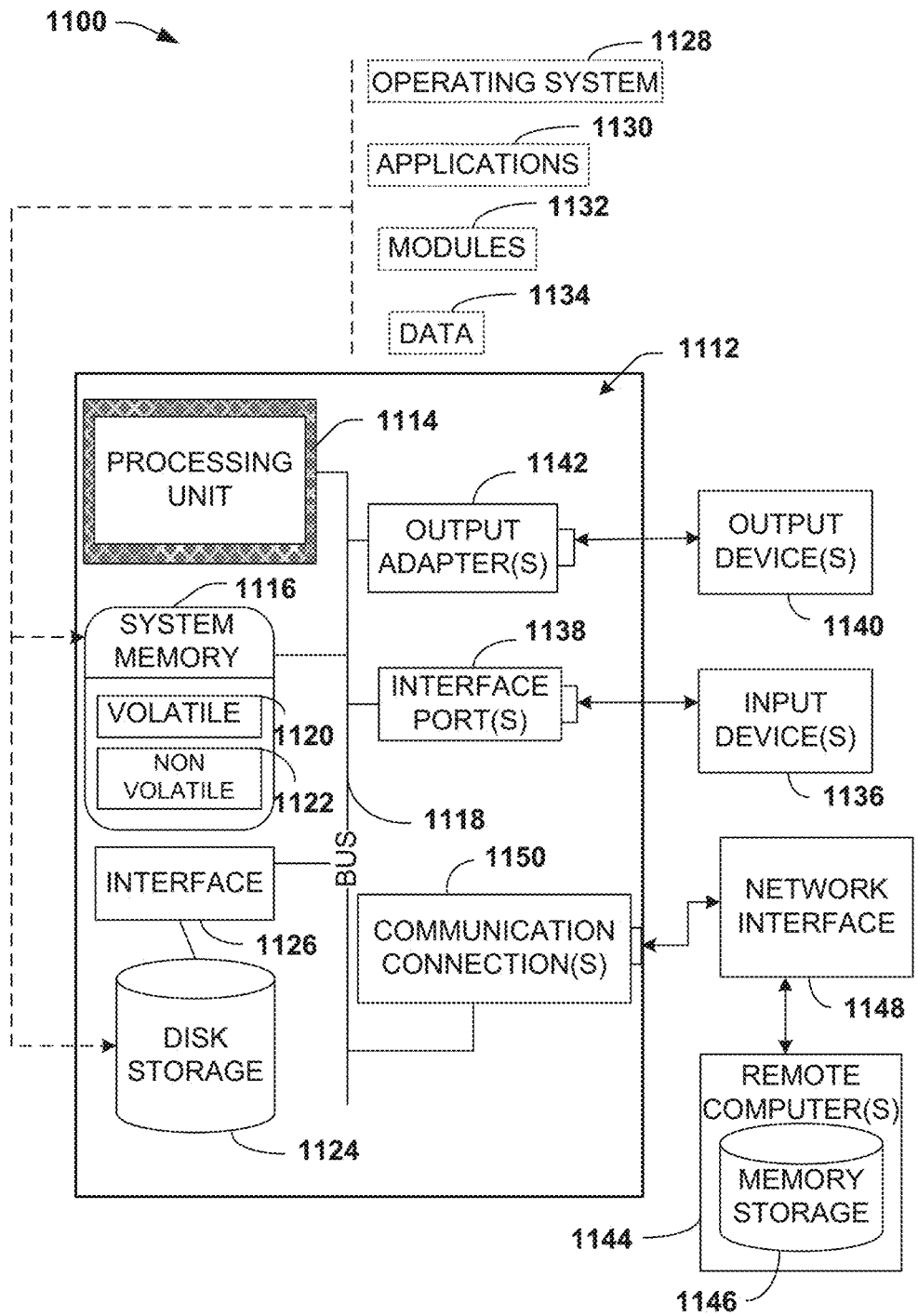

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with one or more embodiments/implementations described herein. Computer 1112, can comprise a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial busport can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   in a distributed computing system, evaluating, by a system comprising a processor, a computing resource load value that represents a computing resource load, and a moving average convergence divergence (MACD) trend factor that indicates whether the computing resource load is increasing or decreasing; and
   in response to the computing resource load value being above a resource addition threshold value and the MACD trend factor indicating that the computing resource load is increasing, facilitating, by the system, enabling use of additional computing resources by the distributed computing system, and
   obtaining, by the system, the MACD trend factor, wherein the MACD trend factor indicates that the computing resource load is increasing when a moving average convergence divergence histogram is above a moving average convergence divergence baseline, and the MACD trend factor indicates that the computing resource load is decreasing when the moving average convergence divergence histogram is below the moving average convergence divergence baseline.

2. The method of claim 1, further comprising, in response to the computing resource load value being less than a resource removal threshold value and the MACD trend factor indicating that the computing resource load is decreasing, facilitating, by the system, removing computing resources for use by the distributed computing system.

3. The method of claim 1, further comprising, in response to the computing resource load value being less than a resource removal threshold value, the MACD trend factor indicating that the computing resource load is decreasing, and the computing resource not being at a minimum level, facilitating, by the system, removing computing resources for use by the distributed computing system.

4. The method of claim 1, further comprising obtaining, by the system, the computing resource load value, wherein the computing resource load value comprises a reported resource load averaged over a prior interval time.

5. The method of claim 1, further comprising based on the computing resource load, obtaining, by the system, the MACD trend factor.

6. The method of claim 1, further comprising obtaining, by the system, a computing resource addition threshold value based on multiplying a number of one or more computing resources by a predetermined addition percentage value.

7. The method of claim 6, wherein the computing resource load corresponds to a number of one or more processors, and wherein the method further comprises obtaining, by the system, the computing resource addition threshold value based on multiplying the number of the one or more processors by a selected multiplier.

8. The method of claim 1, further comprising, in response to the computing resource load value being less than a computing resource removal threshold value and the MACD trend factor indicating that the computing resource load is decreasing, removing, by the system, a computing resource from the distributed computing system, wherein the computing resource removal threshold value is obtained by multiplying a number of computing resources by a predetermined removal percentage value.

9. The method of claim 8, wherein the computing resource load corresponds to a number of processors, and wherein the computing resource removal threshold value is obtained by multiplying the number of processors by a selected multiplier.

10. A scaling system, comprising:
    a processor; and
    a memory that stores executable instructions that, when executed by the processor, facilitate performance of operations, comprising:
        obtaining a load value representative of a computing resource load;

obtaining a moving average convergence divergence (MACD) trend factor indicative of whether the computing resource load is decreasing; in response to:
the load value being determined to be greater than an addition threshold value and in response to the MACD trend factor indicating that the computing resource load is not decreasing, initiating use of an additional processor to processors available for use by the distributed computing system, or
the MACD trend factor indicating that the computing resource load is decreasing, removing one of the processors from the processors available for use by the distributed computing system; and
obtaining, by the system, the MACD trend factor, wherein the MACD trend factor indicates that the computing resource load is increasing when a moving average convergence divergence histogram is above a moving average convergence divergence baseline, and the MACD trend factor indicates that the computing resource load is decreasing when the moving average convergence divergence histogram is below the moving average convergence divergence baseline.

11. The scaling system of claim 10, wherein the load value representative of the computing resource load comprises a load average value determined over a prior time period.

12. The scaling system of claim 10, wherein the load value representative of the computing resource load corresponds to measured processor utilization.

13. The scaling system of claim 10, wherein the MACD trend factor is based on a moving average convergence divergence indicator of the computing resource load.

14. The scaling system of claim 10, wherein the addition threshold value comprises a percentage value of greater than fifty percent multiplied by a number of one or more of current computing resources that are currently in use.

15. The scaling system of claim 10, wherein the removal threshold value comprises a percentage value of less than fifty percent multiplied by a number of one or more of current computing resources that are currently in use.

16. A non-transitory machine-readable medium, comprising executable instructions that, when executed by a processor, facilitate performance of operations, the operations comprising:
obtaining a load value representative of a computing resource load corresponding to computing resource utilization of computing resources of a distributed computing system;
obtaining a trend factor indicative of whether the computing resource load is increasing, wherein the trend factor comprises a moving average convergence divergence (MACD) indicator;
determining whether to scale up or scale down a number of the computing resources in use, comprising:
in response to the load value being greater than an addition threshold value and the trend factor indicating that the computing resource load is increasing, enabling addition of a first processor to processors currently being used by the distributed computing system, or
in response to the load value being less than a removal threshold value and the trend factor indicating that the computing resource load is not increasing, disabling use of a second processor of the processors currently used by the distributed computing system; and
obtaining, by the system, the trend factor, wherein the trend factor indicates that the computing resource load is increasing when a moving average convergence divergence histogram is above a moving average convergence divergence baseline, and the trend factor indicates that the computing resource load is decreasing when the moving average convergence divergence histogram is below the moving average convergence divergence baseline.

17. The non-transitory machine-readable medium of claim 16, wherein the operations further comprise, obtaining the addition threshold value by multiplying the number of computing resources in use by an addition fractional value, and obtaining the removal threshold value by multiplying the number of computing resources in use by a removal fractional value.

18. The non-transitory machine-readable medium of claim 16, wherein the obtaining the trend factor comprises forecasting a system load trend using a result of a moving average convergence divergence prediction.

19. The non-transitory machine-readable medium of claim 16, wherein the obtaining the load value comprises requesting a report of a load average measured over a prior time period measured for the distributed computing system.

20. The non-transitory machine-readable medium of claim 16, wherein the computing resource load corresponds to a number of one or more processors, and wherein the operations further comprise obtaining the computing resource addition threshold value based on multiplying the number of the one or more processors by a selected multiplier.

* * * * *